United States Patent [19]

Kikuchi et al.

[11] Patent Number: 4,673,984
[45] Date of Patent: Jun. 16, 1987

[54] MULTIPLE SCANNING TYPE TELEVISION RECEIVER

[75] Inventors: Masafumi Kikuchi, Kanagawa; Hiroshi Sakamoto, Tokyo, both of Japan

[73] Assignee: Sony Corporation, Tokyo, Japan

[21] Appl. No.: 852,362

[22] Filed: Apr. 15, 1986

[30] Foreign Application Priority Data

Apr. 19, 1985 [JP] Japan ................................. 60-83659

[51] Int. Cl.$^4$ ............................................... H04N 3/18
[52] U.S. Cl. .................................... 358/190; 358/188; 315/411
[58] Field of Search ............... 358/190, 188, 140, 243; 315/411, 379, 364

[56] References Cited

U.S. PATENT DOCUMENTS 4,412,254 10/1983 Lang ............................... 315/411 X
4,516,169 5/1985 Truskalo ............................ 358/190
4,536,689 8/1985 Babcock ............................ 315/411

Primary Examiner—James J. Groody
Assistant Examiner—Victor R. Kostak
Attorney, Agent, or Firm—Philip M. Shaw, Jr.

[57] ABSTRACT

In a multiple scanning type television receiver in which a horizontal frequency of a horizontal deflection circuit and a capacity value of an S-shaping capacitor are both switched by an output signal from a frequency to voltage converter which detects a horizontal frequency of an input signal and converts the same to a voltage changing in response to the frequency, a horizontal deflection circuit of a multiple scanning type television receiver being characterized in that a detector is provided for detecting said switching time point and during a transient period obtained from said detector, the power source of said horizontal deflection circuit is cut off.

8 Claims, 11 Drawing Figures

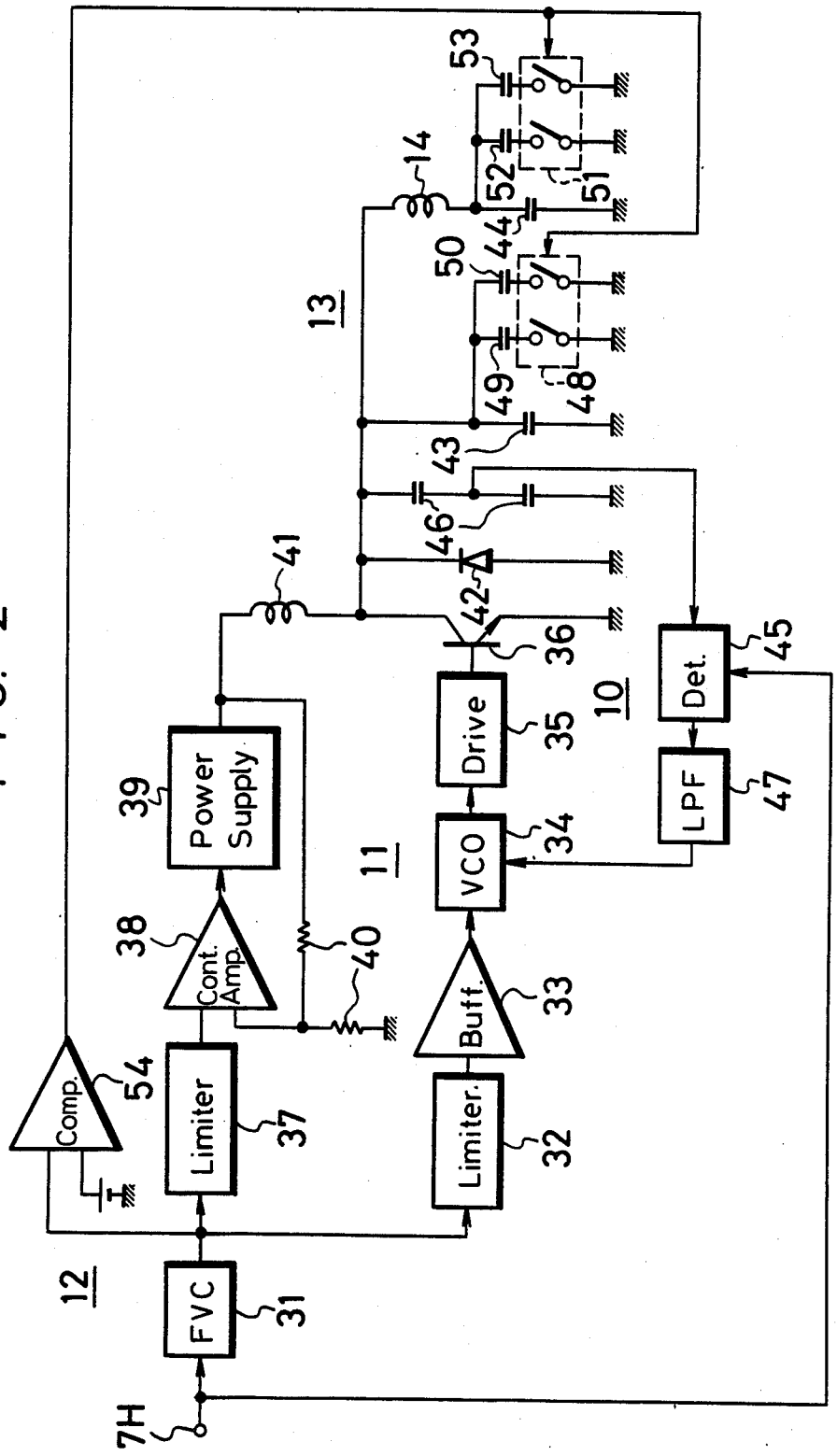

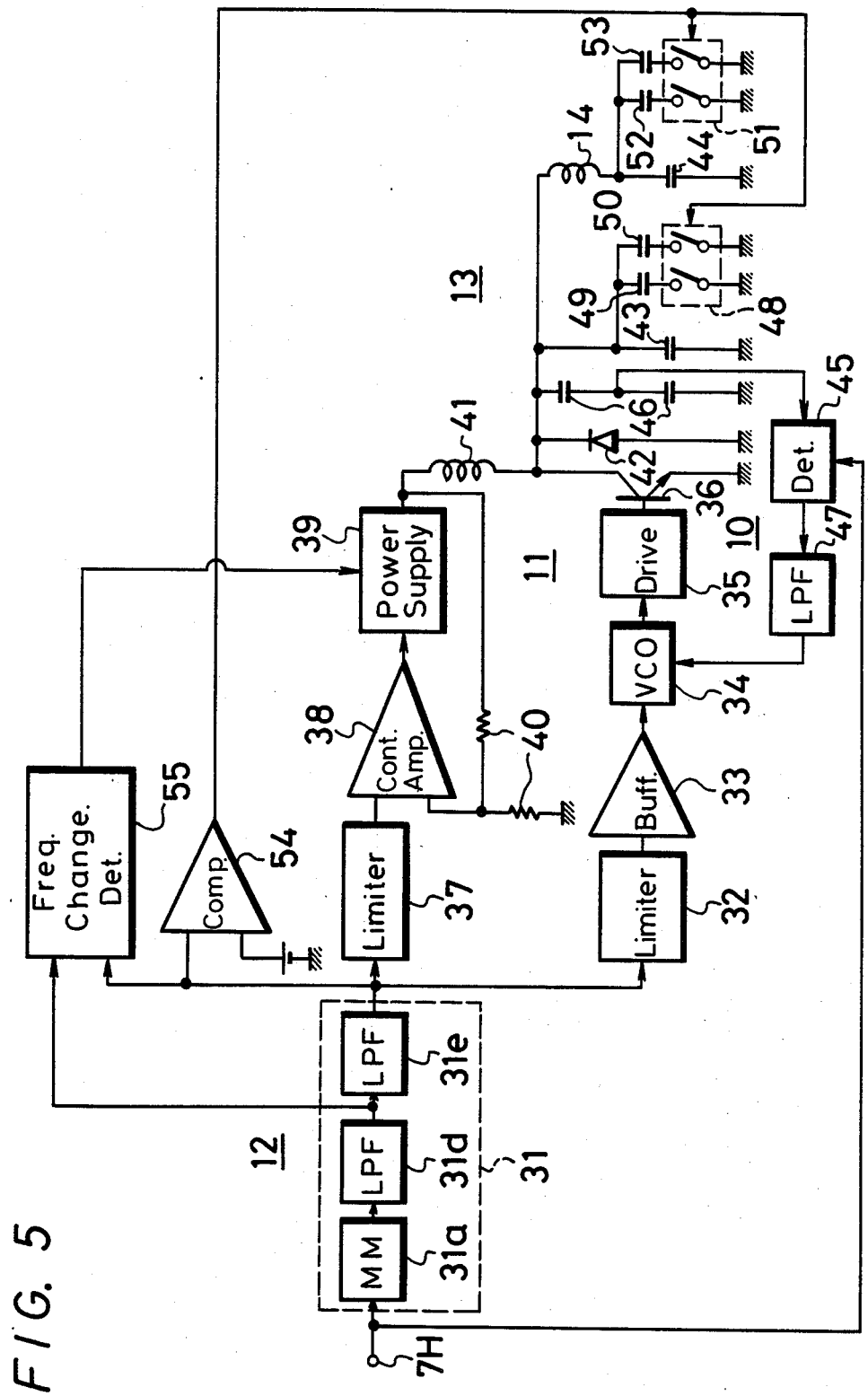
F I G. 5

MULTIPLE SCANNING TYPE TELEVISION RECEIVER

TECHNICAL FIELD

This invention relates to a horizontal deflection circuit of a multiple scanning type television receiver which is designed to be able to receive, in addition to the reception of standard television broadcasting signals, a video signal having different line frequencies from a scanning converter, which for example, doubles the line frequency.

CROSS-REFERENCE TO RELATED CO-PENDING APPLICATION

This invention is directed to an improvement to a MULTIPLE SCANNING TYPE TELEVISION RECEIVER disclosed in co-pending application Ser. No. 786,249, filed Oct. 10, 1985, by Masafumi Kikuchi, Hiroshi Sakamoto, Toshio Onodera and Sumio Toyama.

BACKGROUND ART

For a television signal according to the NTSC system, a video picture is composed with a vertical frequency of about 60 Hz and a horizontal line frequency of about 15.75 KHz. A scanning converter has been proposed which improves the reproduced picture quality by doubling the number of horizontal lines. When this scanning converter is used, the video signal derived therefrom has a vertical frequency of around 60 Hz while it has a horizontal frequency of about 31.5 Khz.

Some computers having a so-called high resolution display are designed to produce a video signal having a line frequency of about 24 KHz. Further, a so-called high definition television (HDTV) system employs a line frequency of about 33.75 KHz.

At present, a multiple scanning type television receiver has been proposed by Sony, as described in more detail in the above-identified co-pending application, which can commonly receive and display various video signals having different line frequencies using a single receiver.

In the proposed multiple scanning type television receiver there is the problem, to be explained in greater detail hereinafter, that in switching between the horizontal and/or vertical frequencies and various video frequencies having different deflecting frequencies, circuit damaging transient voltages are generated in the horizontal deflection circuit. Unless expensive components having wide operating parameters are used, there is the danger that there may be a malfunction.

SUMMARY OF THE INVENTION

The above problem is overcome by the present invention which is intended for use in combination with a horizontal deflection circuit of a multiple scanning type television receiver which is designed to be able to receive video signals having different line frequencies in addition to the reception of the standard television broadcasting. Such a horizontal deflection circuit has means for switching the horizontal frequency of the horizontal deflection circuit and the capacity value of an S-shaping capacitor by an output signal from a frequency to voltage converter which detects the frequency of the horizontal sync. input signal and converts the same to a corresponding voltage. The invention comprises a detector to detect this switching time point and to cut off the power supply source to the output switching device of the horizontal deflection circuit during a transient period obtained from the detector, to thereby reduce transient currents generated in the horizontal output circuit when the horizontal frequency of the television signal is switched.

It is therefore an object of the present invention to provide a reliable horizontal deflection circuit for a multiple scanning type television receiver.

It is a further object to provide a horizontal deflection circuit for a multiple scanning type television receiver wherein current transients during switching from one scanning rate to another are substantially eliminated.

These and other objects, features and advantages of the present invention will become apparent from the following detailed description of the preferred embodiment taken in conjunction with the accompanying drawing, throughout which like reference numerals designate like elements and parts.

BRIEF DESCRIPTION OF THE DRAWINGS

FIG. 2 is a circuit diagram showing a horizontal deflection stage of FIG. 1;

FIG. 5 is a circuit diagram showing one embodiment of a main portion of the present invention;

BEST MODE FOR CARRYING OUT THE INVENTION

Figure 1:
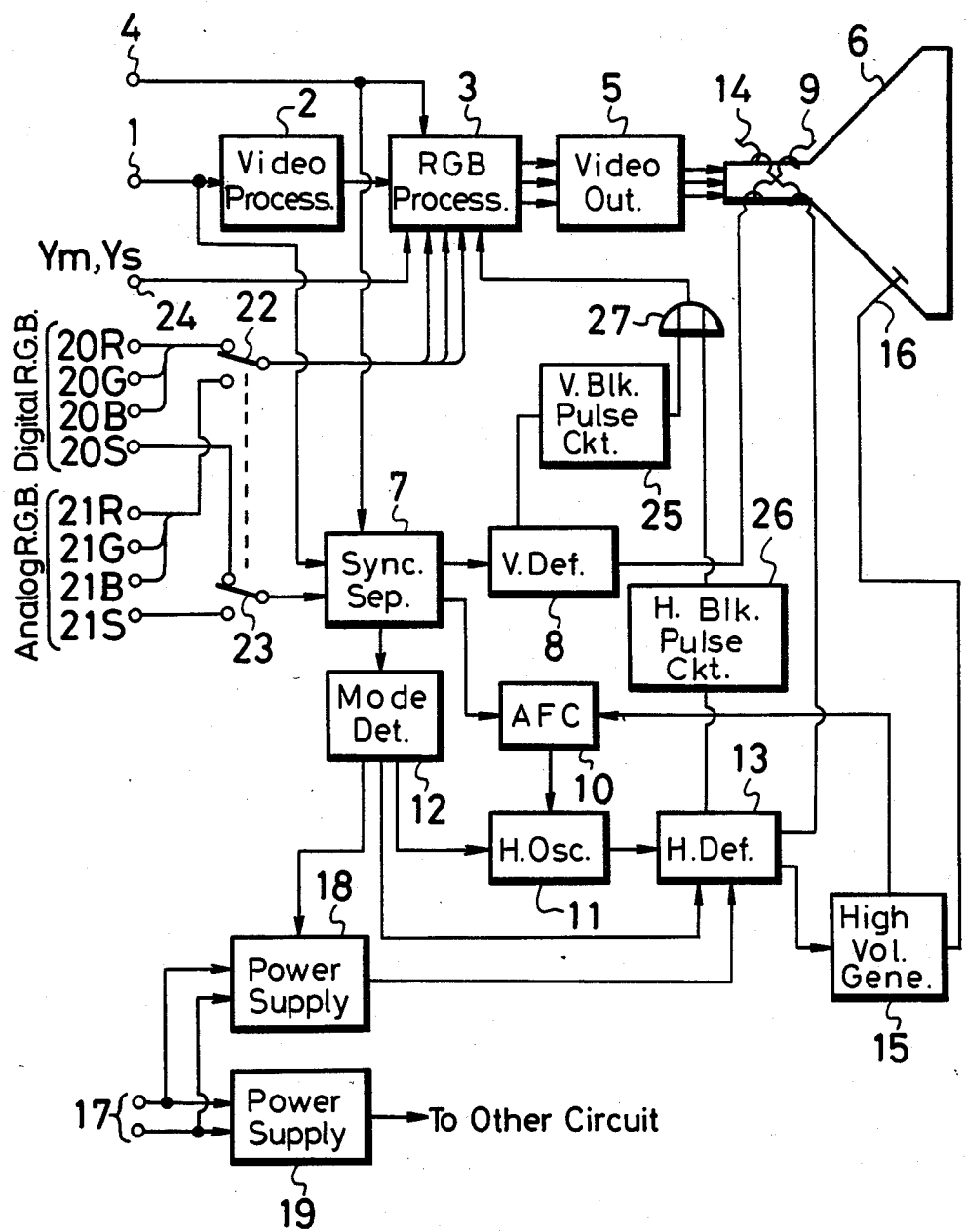
FIG. 1 is a block diagram showing a multiple scanning type television receiver previously proposed by the same applicant as that of this application.

FIG. 1 shows an example of a multiple scanning type television receiver. Referring to FIG. 1, when receiving a standard composite video signal from a tuner for standard television broadcasting, a video tape recorder, a video disc player, a tuner for the satellite broadcasting or some personal computers, etc., a composite video signal applied to an input terminal 1 is supplied through a video processing circuit 2 to an RGB processing circuit 3 and thereby three primary color signals R (red), G (green) and B (blue) are formed. A video/RGB switching signal applied to another input terminal 4 is supplied to the RGB processing circuit 3 and the three primary color signals of the video signal selected thereby are supplied through a video output circuit 5 to a color cathode ray tube 6.

The composite video signal from the input terminal 1 is supplied to a synchronizing (sync.) separator circuit 7 in which vertical and horizontal synchronizing signals are separated therefrom. The switching signal from the input terminal 4 is supplied to the sync. separator circuit 7 and the vertical synchronizing signal selected thereby from the video signal is supplied to a vertical deflection circuit 8. The vertical deflection signal from the vertical deflection circuit 8 thus provided is supplied to a vertical deflection yoke 9 of the color cathode ray tube 6.

The horizontal synchronizing signal of the video signal selected by the sync. separator circuit 7 is supplied to an AFC (automatic frequency control) circuit 10. The signal from the AFC circuit 10 is supplied to a horizontal oscillator circuit 11 and a control signal from a mode detector circuit 12 is supplied to the horizontal oscillator circuit 11. The mode detector circuit 12, as will be hereinafter explained, detects what type of signal is to be displayed, e.g., standard broadcast signals, high definition display, etc.

The signal from the horizontal oscillator circuit 11 is supplied to a horizontal deflection circuit 13 which outputs a horizontal or line deflection signal to a horizontal deflection yoke 14 of the color cathode ray tube 6. The signal from the horizontal deflection circuit 13 is supplied to a high voltage generator circuit 15 which contains a flyback transformer or the like. The high voltage produced in the high voltage generator circuit 15 is supplied to a high voltage terminal 16 of the color cathode ray tube 6 and a part of the signal therefrom is supplied to the AFC circuit 10. The output signal from the vertical deflection circuit 8 is supplied to a vertical blanking pulse generator circuit 25, while the output signal from the horizontal deflection circuit 13 is supplied to a horizontal blanking pulse generator circuit 26. The vertical and horizontal blanking pulses from the vertical and horizontal blanking pulse generator circuits 25 and 26 are supplied through an OR gate 27 to the RGB processing circuit 3.

Power from a commercially available power supply connected to terminal 17 is supplied to a power supply circuit 18 and a power supply voltage, the value of which is controlled by the signal from the mode detector circuit 12, is supplied from the power supply circuit 18 to the horizontal deflection circuit 13. The commercially available power from the power supply terminal 17 is supplied to another power supply circuit 19 and the power supply voltage therefrom is fed to other utilization circuits (not shown).

Thus a standard, namely, normal composite video signal is received and reproduced on the color cathode ray tube 6. On the other hand, the previously proposed multiple scanning type television receiver can also receive three primary color output signals of R, G and B (hereinafter simply RGB signals) in the form of digital or analog fashion from personal computers, so-called "CAPTAIN" (Character And Pattern Telephone Access Information Network) decoders, teletext decoders or scanning converters, etc., digital RGB signals supplied to input terminals 20R, 20G and 20B or analog RGB signals supplied to input terminals 21R, 21G and 21B, which are selected by a change-over switch 22. The signals selected by switch 22 are then fed to the RGB processing circuit 3, in which the RGB signals are selected by the video/RGB switching signal from the input terminal 4 and fed to the video output circuit 5.

Either a digital synchronizing signal from an input terminal 20S or an analog synchronizing signal from an input terminal 21S are selected by a change-over switch 23 and the selected signal is then fed to the sync. separator circuit 7, in which the selected signal is further selected by the switching signal from the input terminal 4 and fed to the vertical deflection circuit 8 and to the AFC circuit 10. The signal from the sync. separator circuit 7 is supplied to the mode detector circuit 12 in which the control signal in response to the frequency of the horizontal sync. signal is formed. The control signal is supplied to the horizontal oscillator circuit 11, the horizontal deflection circuit 13 and to the power supply circuit 18, respectively.

Thus, the three primary color signals of digital or analog RGB signals are received and reproduced on the color cathode ray tube 6. Further, when a so-called superimposed reception is desired to be carried out in which the RGB signals are displayed superimposed with the normal composite video signal, the switching signal applied to the input terminal 4 is made as an RGB mode signal. Also, a signal Ys indicative of the position of a signal to be superimposed and a signal Ym indicative of an area of the signal to be superimposed, which are both applied to an input terminal 24, are supplied to the RGB processing circuit 3, in which the composite video signal and the RGB signals are selectively switched by these signals Ys and Ym.

As described above, various video signals are received and reproduced. In the above television receiver, the horizontal deflection section is in practice formed as shown in FIG. 2. Referring to Fig. 2, the horizontal synchronizing signal from the sync. separator circuit 7 is supplied through a horizontal synchronizing signal input terminal 7H to a frequency to voltage converter (FVC) circuit 31 which forms the mode detector circuit 12 and thereby a voltage in response to the horizontal frequency is formed. This FVC circuit 31 is constructed as shown, for example, in FIG. 3 in which the horizontal synchronizing signal from the horizontal synchronizing signal input terminal 7H is supplied to a monostable multivibrator 31a having a predetermined time constant. The output signal from the monostable multivibrator 31a is supplied to a low pass filter 31b which forms a smoothing circuit. A voltage which changes corresponding to the horizontal frequency is developed at an output terminal 31c of the low pass filter 31b.

Turning back to FIG. 2, this voltage developed at the output terminal 31c is supplied through a limiter circuit 32 which determines the lower limit and a buffer amplifier 33 to a voltage-controlled type variable frequency oscillator (VCO) 34 which forms the horizontal oscillator circuit 11. The oscillating output from this VCO 34 is supplied through a driver circuit 35 to a switching transistor 36 which forms the horizontal deflection circuit 13.

Further, the voltage from the FVC circuit 31 is supplied through a limiter circuit 37 which determines the upper and lower amplitude limits and a control amplifier 38 to, for example, a Y-Z type parametric power source circuit 39 which forms the power supply circuit 18. The output voltage of this power supply circuit 39 is fedback through a voltage divider circuit 40 to the control amplifier 38 and thereby the output voltage is stabilized. This stabilized output voltage is supplied to a flyback transformer 41.

The switching or horizontal output transistor 36 is connected in series with the flyback transformer 41 to the circuit ground. A damper diode 42, a resonant capacitor 43 and a series circuit formed of the horizontal deflection yoke 14 and an S-shaping capacitor 44 are respectively connected in parallel with this transistor 36.

The horizontal synchronizing signal is supplied from terminal 7H to a detector circuit 45 which forms the AFC circuit 10 and the signal from a reactive component, voltage divider 46 connected in parallel to the transistor 36 is supplied to the detector circuit 45 and thereby an AFC signal is provided therefrom. This AFC signal is supplied through a low pass filter (LPF) 47 to the control terminal of the VCO 34.

Capacitors 49 and 50 are each connected in parallel to the resonant capacitor 43 via a switching circuit 48. Capacitors 52 and 53 are each connected in parallel to the S-shaping capacitor 44 via a switching circuit 51. The voltage from the FVC circuit 31 is supplied to a comparator circuit 54 which is of a 2 value comparison type, and which compares the input to reference voltages corresponding to, for example, input line frequencies of 20 KHz and 30 KHz and thereby 3 value-output signals corresponding to the three frequency ranges of lower than 20 KHz, 20 to 30 KHz, and higher than 30 KHZ are generated. In response to the compared outputs from the comparator circuit 54, the switching circuits 48 and 51 are controlled such that both of two switches incorporated therein are turned off or either of them is turned on depending upon which of the three signals is output by the comparator 54.

Accordingly, in this horizontal deflection section, the VCO 34 produces an oscillating signal having a frequency changing in a range from 15 to 34 KHZ in synchronism with the input horizontal synchronizing signal thereby to carry out the horizontal deflection, while the power supply circuit 39 generates a voltage changing in a range from, for example, 58 to 123 volts in proportion to the line frequency and thereby the amplitude of the horizontal deflection signal is controlled to be constant. The capacitors 49, 50 and 52, 53 are connected in parallel to the resonant capacitor 43 and the S-shaping capacitor 44, respectively, according to the range of the input horizontal frequency to thereby carry out the correction of the characteristics.

Figure 4:
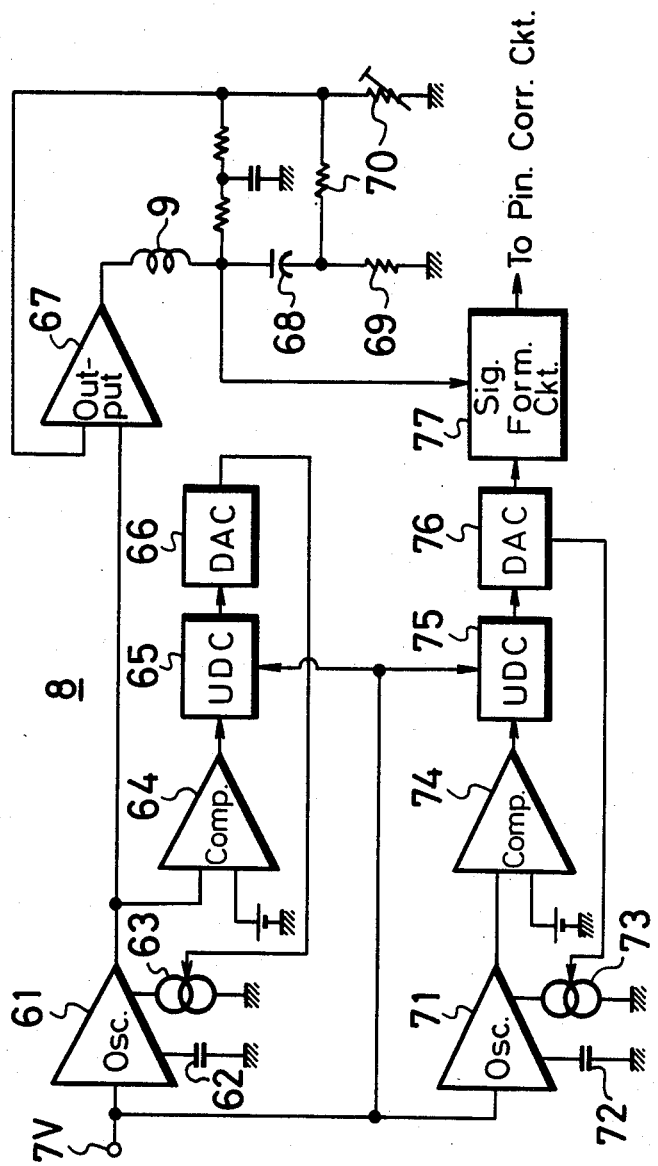
FIG. 4 is a circuit diagram showing a vertical deflection stage of FIG. 1.

Further in the television receiver shown in Fig. 1, the vertical deflection section is practically constructed as shown in FIG. 4. As FIG. 4 shows, the vertical synchronizing signal from the sync. separator circuit 7 is supplied through a vertical synchronizing signal input terminal 7V to a sawtooth-wave oscillator 61 which forms a part of the vertical deflection circuit 8, and a capacitor 62, for example, is charged and discharged by the current from a current source 63 to form a vertical sawtooth wave. This sawtooth wave is supplied to a two value comparator circuit 64 which produces compared outputs indicative of a predetermined voltage region; a voltage region lower than the predetermined voltage and a voltage region higher than the predetermined voltage. This compared output is supplied to a control terminal of an up-down counter (U.D.C.) 65. The U.D.C. is supplied at its counting terminal with the vertical synchronizing signal. The counted value from the U.D.C. 65 is supplied to a D/A (digital-to-analog) converter (hereinafter simply D.A.C.) 66 and the current source 63 is controlled by the converted analog value from the D.A.C. 66.

As a result, the sawtooth wave generator 61 generates, regardless of the frequency of the vertical synchronizing signal, a sawtooth wave the height (the amplitude) of which is controlled to fall in a predetermined voltage region. This sawtooth wave is supplied through a vertical output circuit 67 to the vertical deflection yoke 9. A series circuit formed of a capacitor 68 and a resistor 69 is connected in series with the vertical deflection yoke 9 and a voltage divider 70 is connected in parallel with the resistor 69. The divided output from the voltage divider 70 is supplied to the vertical output circuit 67 as a differential input.

Thus, the vertical deflection is carried out always constantly regardless of the vertical frequency. If one resistor, which forms a part of the voltage divider 70, is made variable, it is possible to control the amplitude of the vertical deflection to become a desired one.

Another circuit (formed of oscillator 71 to D.A.C. 76) is provided and is formed in the same manner as the sawtooth wave oscillator 61 to D.A.C 66. The output value of the D.A.C 76 in this circuit is supplied to a pincushion correction signal forming circuit 77 and a vertical parabolic signal obtained at, for example, the connection point between the vertical deflection yoke 9 and the capacitor 68 is supplied as a differential input to the pincushion correction signal forming circuit 77 which generates a pincushion correction signal. The pincushion correction signal is delivered to a pincushion correction circuit (not shown).

In the above mentioned television receiver, the necessary horizontal and/or vertical deflections are carried out in response to various horizontal and/or vertical frequencies and various video signals having different deflection frequencies can thus be received and reproduced.

So far only the multiple scanning receiver disclosed in the above mentioned co-pending application has been described. Certain problems in this receiver and their solution by the present invention will now be described. In the horizontal deflection circuit 13 of such a multiple scanning type television receiver, the capacitors 49, 50 and 52, 53 are switchably connected in parallel to the resonant capacitor 43 and the S-shaping capacitor 44 in response to the horizontal frequency of the video signal to be reproduced. In this case, when the capacitors 49, 50 and 52, 53 are switched into the circuit in response to a change in the scanning frequency, it was noticed by the applicant that a large transient current flows in the horizontal deflection circuit elements such as the horizontal output transistor 36 and the like. There is then the fear that these circuit elements could be destroyed by such a large transient current. As a result, expensive circuit elements whose safe operation ranges are wide will have to be used for a safe operation.

In view of the above aspect, the present invention is intended to suppress the transient current to a small value when the capacitors are switched into the circuit in response to the horizontal frequency. Accordingly, as best shown in FIG. 5, there is provided a frequency change detector 55 which detects this switching time point and during a transient period obtained from the frequency change detector 55, the power source for the output switching device 36 of the horizontal deflection circuit 13 is cut off, to thereby stop the power source momentarily, and make it possible to reduce the transient current when the capacity value of the S-shaping capacitor 44 is switched in response to the change in the horizontal frequency.

Figure 3:
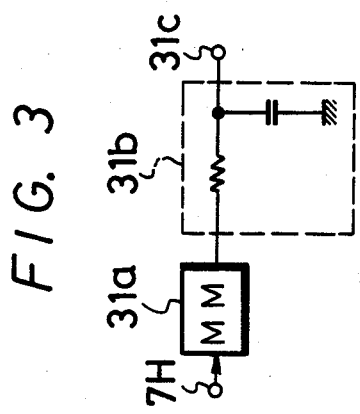
FIG. 3 is a circuit diagram showing one example of the frequency to voltage converter used in FIG. 2.
Figure 6:
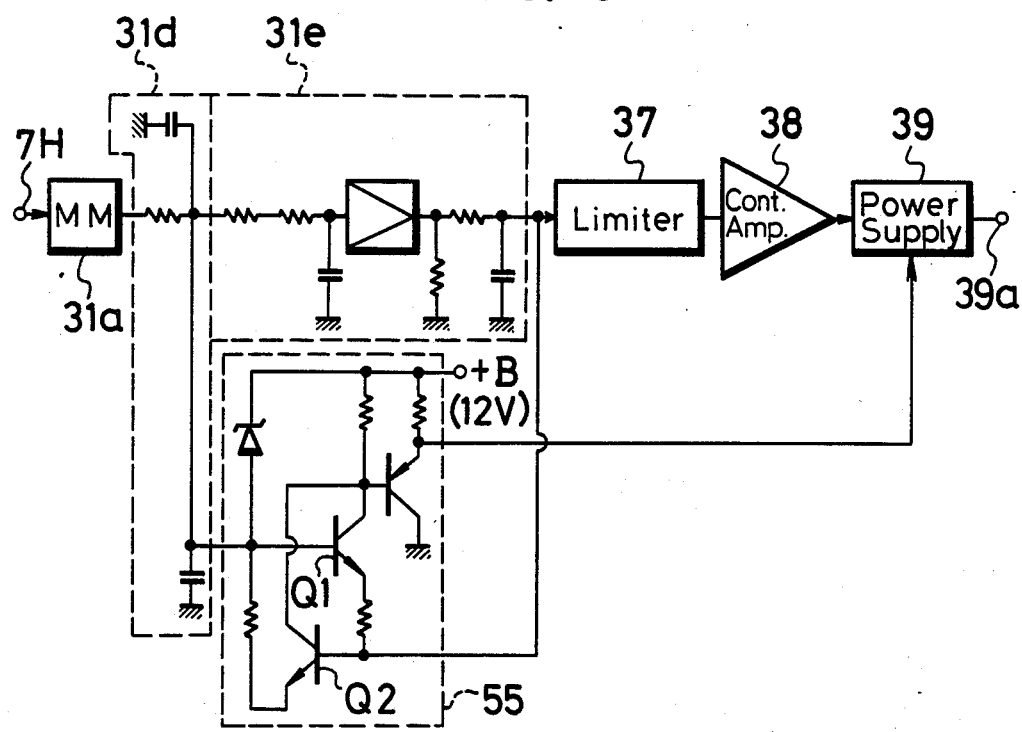
FIG. 6 is a circuit diagram showing one example of a main portion of FIG. 5.

An embodiment of a horizontal deflection circuit of a multiple scanning type television receiver according to the present invention will hereinafter be described with reference to FIGS. 5, 6 and 7. In Figs. 5, 6 and 7, like parts corresponding to those of Figs. 1, 2 and 3 are marked with the same references and their detailed description will be omitted.

According to this embodiment, a horizontal deflection circuit section of the multiple scanning type television receiver shown in FIG. 1 is constructed as shown in FIG. 5.

In this embodiment, the low pass filter which forms the smoothing circuit in the frequency to voltage converting (FVC) circuit 31 is constructed of series connected low pass filters, namely, a series circuit formed of a first low pass filter 31d and a second low pass filter 31e, connected to the output of the multivibrator 31a. The output signal from the first low pass filter 31d and the output signal from the second low pass filter 31e are both supplied to a frequency change detector 55.

Figure 7A:
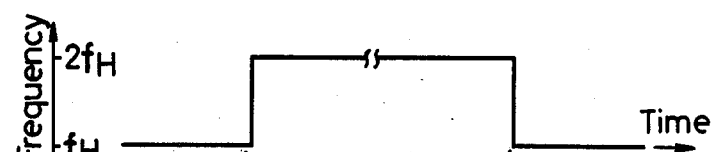
FIGS. 7A to 7D are waveform diagrams respectively to be used for explaining the operation of FIGS. 5 and 6.
Figure 7B:
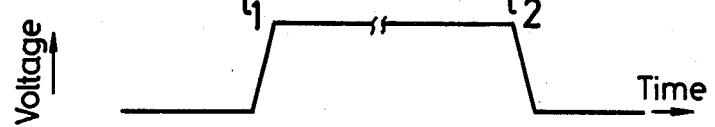
Figure 7C:
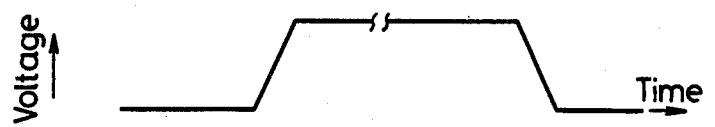
Figure 7D:
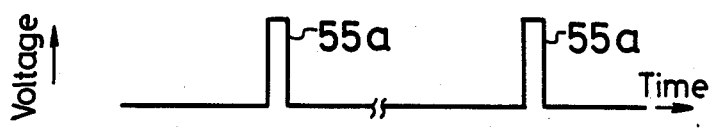

This frequency change detector 55 generates a control signal when a voltage difference between the output signal of the first low pass filter 31d and the output signal of the second low pass filter 31e exceeds a predetermined value. Specifically, if the horizontal frequency of the reproduced video signal is changed from $f_H$ to $2f_H$ at a time point t1 and from $2f_H$ to $f_H$ at time point t2 as shown in FIG. 7A, the output voltages of the first and second low pass filters 31d and 31e become as shown in FIGS. 7B and 7C, respectively.

Due to the rising and falling time constants of the first and second low pass filters 31d and 31e, the waveforms of these output voltages are inclined at the time points t1 and t2, respectively. Since the output signal (shown in FIG. 7B) of the first low pass filter 31d, is supplied to the second low pass filter 31e, the inclination angle of the output signal (shown in FIG. 7C) from the second low pass filter 31e becomes smaller than that of the output signal from the first low pass filter 31d. The difference therebetween becomes larger than a predetermined voltage value in a certain range. Consequently, the frequency change detector 55 generates at its output side a control signal 55a shown in FIG. 7D and the pulse width thereof becomes, for example, 70 ms.

In response to the control signal 55a developed at the output side of the frequency change detector 55, the power supply circuit for the switching device of the horizontal deflection circuit 13 is turned off during the period of this control signal 55a. In this case, this control signal 55a corresponds to the transient period of the resonant capacitor 43 and the S-shaping capacitor 44 in which the switching circuits 48 and 51 are switched.

In FIG. 5, other portions are formed similarly to those in FIG. 2. FIG. 6 shows the details of the circuit arrangements of the low pass filters 31d and 31e of the FVC circuit 31 and the frequency change detector 55. Here the low pass filter 31e is shown to include a buffer amplifier. The voltage difference is detected by a transistor Q1.

Since this embodiment of the horizontal deflection circuit is constructed as described above, when a video signal to be reproduced is switched, if the horizontal frequency is changed at that time, a predetermined difference is produced between the output signals from the first and second low pass filters 31d and 31e in the FVC circuit 31 so that the frequency change detector 55 generates at its output side the control signal 55a by which the power supply circuit for the output switching device of the horizontal deflection circuit 13 is turned off momentarily. Accordingly, at that time, even if the capacity values of the resonant capacitor 43 and the S-shaping capacitor 44 used to switch the horizontal frequency of the horizontal deflection circuit 13 are changed, their transient currents are forced to be small and hence the circuit elements such as the horizontal output transistor 36 and the like are not damaged. Therefore, the safe operation range of these elements does not have to be made wider than is necessary. Furthermore, it is not necessary to provide special elements and in addition, since the power is interrupted only momentarily, such interruption does not become conspicuous in the picture on the video screen.

Figure 8:
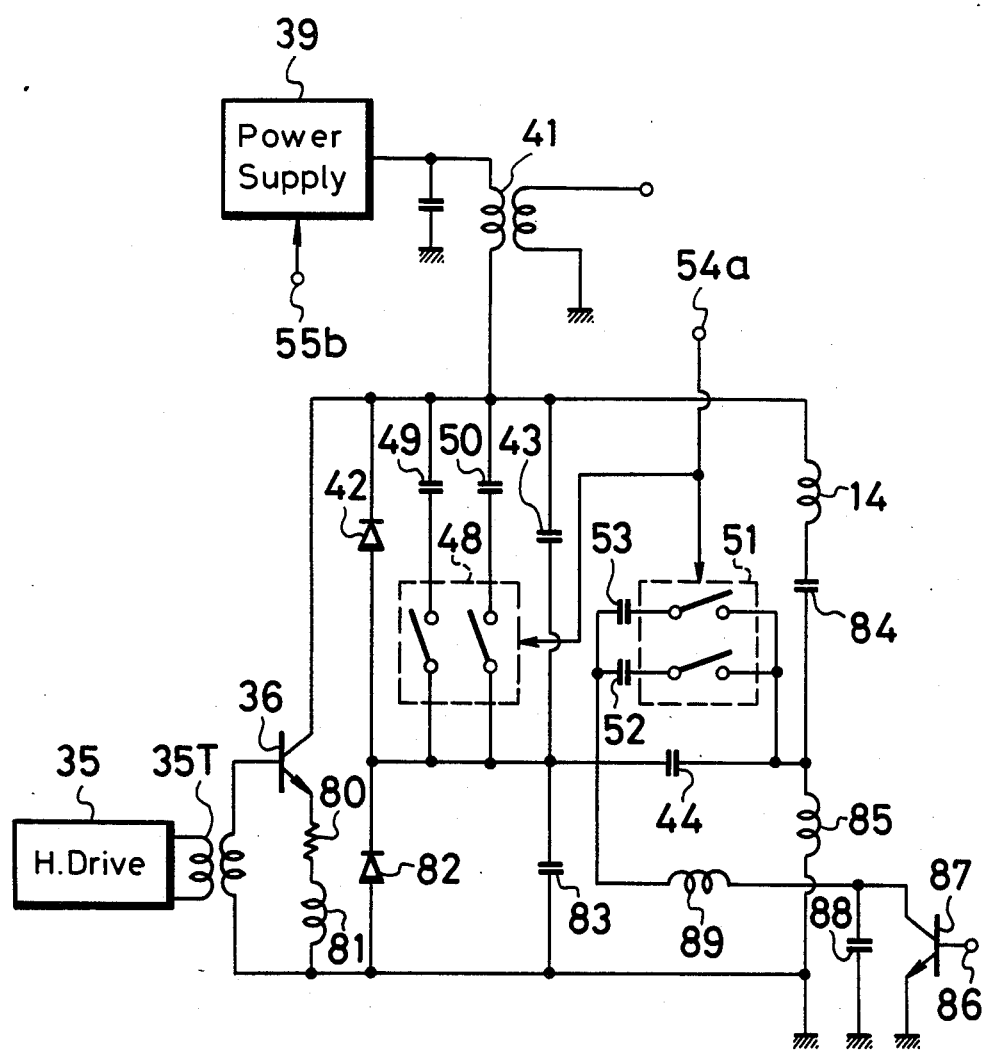
FIG. 8 is a circuit diagram showing another embodiment of a main portion of the present invention.

FIG. 8 shows another embodiment of the present invention which is applied to the horizontal deflection circuit having a well-known pincushion correction circuit. This example will now be described. In FIG. 8, like parts corresponding to those of FIG. 5 are marked with the same references and will not be described in detail.

Referring to FIG. 8, one end of a secondary coil of a driving transformer 35T of the horizontal drive circuit 35 is connected to the base of the horizontal output transistor 36 and the other end of this secondary coil is grounded. The emitter of this transistor 36 is grounded via a series circuit formed of a feedback resistor 80 and a coil 81. The collector of this transistor 36 is grounded via a series circuit formed of the damper diode 42 and a diode 82. The resonant capacitor 43 is connected in parallel to the damper diode 42, and correcting capacitors 49 and 50 are connected in parallel to the resonant capacitor 43 via the switching circuit 48. A capacitor 83 is connected in parallel to the diode 82.

The collector of the transistor 36 is also grounded through a series circuit of the horizontal deflection yoke 14, a capacitor 84 and an additional coil 85 for the pincushion modulation. The junction point between the capacitor 84 and the additional coil 85 is connected through the S-shaping capacitor 44 to the junction point between the capacitors 43 and 83. Correcting capacitors 52 and 53 are connected in parallel to the S-shaping capacitor 44 via the switching circuit 51.

Reference numeral 86 designates a pincushion correction signal input terminal to which a vertical parabolic signal for pincushion correction is applied. This pincushion correction signal input terminal 86 is connected to the base of an npn-type transistor 87 the emitter of which is grounded. The collector of the transistor 87 is connected through a coil 89 to the junction point between the capacitors 43 and 83. Further, the collector of this transistor 87 is grounded through a capacitor 88. The output terminal of the power supply circuit 39 is connected through the flyback transformer 41 to the collector of the transistor 36.

In FIG. 8, reference numeral 54a designates a switching signal input terminal to which the switching signal, namely the output from the comparator circuit 54, is supplied. Reference numeral 55b designates a control signal input terminal to which the control signal 55a from the frequency change detector 55 is applied. Other portions are formed similarly to those of FIG. 5.

In the circuit arrangement shown in FIG. 8, as is well known in the prior art, the inductance values of the horizontal deflection yoke 14 and the additional coil 85 are selected to be substantially equal. Also, the horizontal deflection yoke 14 and the additional coil 85 are connected in parallel to each other in view of an AC circuit so that the total inductance value becomes small. Accordingly, when the capacitors are switchably connected in response to the horizontal frequency, although a larger transient current is intended to flow, the power supply circuit 39 is turned off upon this switchable connection so that the transient current becomes small, achieving the same action and effect as those mentioned above.

According to this invention, when the horizontal frequency of the reproduced video signal is changed, the power supplied to the output switching device of the horizontal deflection circuit 13 is momentarily interrupted so that at that time, even when the capacitive values of the resonant and S-shaping capacitors are switched in accordance with the horizontal frequency of the horizontal deflection circuit 13, the transient current is suppressed to be small and hence the circuit elements such as the horizontal output transistor and the like are not damaged. Thus, there is then an advantage that the safe operation range of these elements do not have to be made wider than is necessary and that inexpensive elements can be used.

Of course, this invention is not limited to the above mentioned embodiments and it can take various modifications without departing from the spirit and scope of the invention.

We claim:

1. A multiple scanning type television receiver of the type comprising:
    a cathode ray tube;
    video signal receiving means for receiving a video signal, a vertical synchronizing signal and a horizontal synchronizing signal;
    a signal processing circuit for supplying said video signal to the cathode ray tube;
    a vertical deflection circuit for supplying a vertical deflection signal to the cathode ray tube in response to said vertical synchronizing signal;
    a horizontal deflection circuit having an output switching device for supplying a horizontal deflection signal to the cathode ray tube in response to said horizontal synchronizing signal;
    frequency detecting means connected to said video signal receiving means for detecting the frequency of said horizontal synchronizing signal and deriving a control signal in response thereto; and
    first control means connected between said frequency detecting means and said horizontal deflection circuit for controlling the latter in response to the first control signal from the former;
characterized by
    a frequency change detector connected to said video signal receiving means for detecting a frequency change of said horizontal synchronizing signal;
    a switchable power supply means for said horizontal output switching device; and
    second control means connected between said frequency change detector means and said switchable power supply means for deactivating said power supply circuit during a transient period when the frequency of the horizontal synchronizing signal changes.

2. A television receiver according to claim 1, further comprising:
    S-shape capacitance switching means included in said horizontal deflection circuit and controlled by said first control signal;
    a resonant capacitor included in said horizontal deflection circuit; and
    means for changing the value of said resonant capacitor in response to said first control signal.

3. A television receiver according to claim 2, wherein said frequency change detecting means includes a monostable multivibrator supplied with said horizontal synchronizing signal;
    first and second low pass filters connected in series with said monostable multivibrator; and
    a level comparator for comparing the output levels of said first and second low pass filters.

4. A television receiver according to claim 1 wherein said video signal receiving means selectively receives a standard and a non-standard video signal.

5. A television receiver according to claim 4 wherein said video signal receiving means includes a first input terminal for receiving the standard video signal and a second input terminal for receiving the non-standard video signal.

6. A television receiver according to claim 5 wherein said standard video signal is in the form of a composite signal and said non-standard video signal is in the form of R, G and B signal.

7. A television receiver of the type which displays a picture on a cathode ray tube, the receiver comprising:
    video signal receiving means for receiving a video signal, a vertical synchronizing signal and a horizontal synchronizing signal;
    a signal processing circuit for supplying said video signal to a cathode ray tube;
    a vertical deflection circuit for supplying a vertical deflection signal to said cathode ray tube in response to said vertical synchronizing signal;
    a horizontal deflection circuit for supplying a horizontal deflection signal to said cathode ray tube in response to said horizontal synchronizing signal, said horizontal deflection circuit including an oscillator operated in synchronism with said horizontal synchronizing signal, a drive stage, an output switching device, a resonant capacitor and an S-shape capacitor power supply means for supplying an operational voltage to said output switching device;
    frequency detecting means connected to said video signal receiving means for detecting the frequency of said horizontal synchronizing signal and deriving a control signal in response thereto; and
    first control means for supplying said control signal to said power supply means for increasing said operational voltage when the horizontal frequency becomes higher; characterized by
    a frequency change detecting means connected to said video signal receiving means for detecting a frequency change of said horizontal synchronizing signal;
    means responsive to said first control signal for switching the capacitance value of said S-shape capacitor;
    second control means connected between said frequency change detecting means and said power supply means for deactivating the latter during a transient period when the frequency of the horizontal synchronizing signal changes.

8. A television receiver according to claim 7 wherein said frequency detecting means and said frequency change detecting means include a common monostable multivibrator supplied with said horizontal synchronizing signal.

* * * * *